June 20, 1939.  R. C. JACOBS  2,163,340
AUTOMOBILE GLARE SHIELD
Filed Aug. 12, 1937
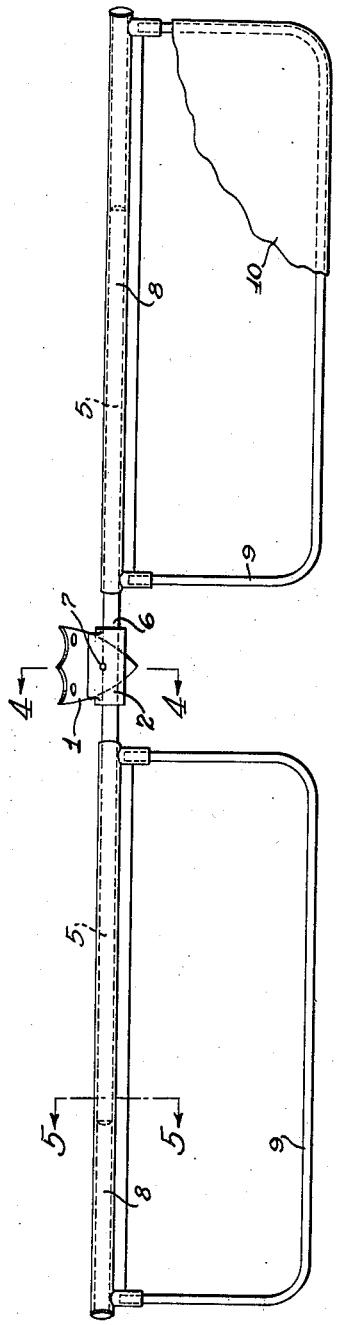
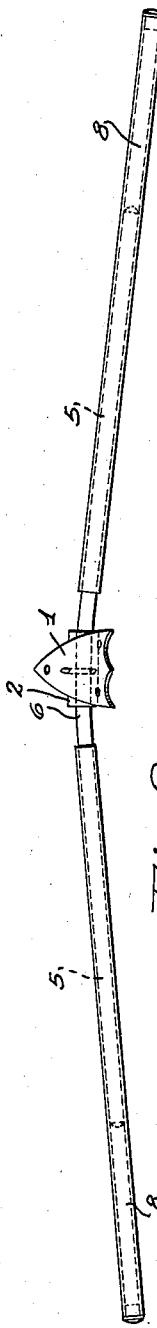
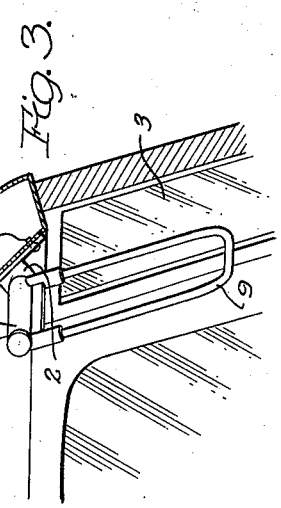
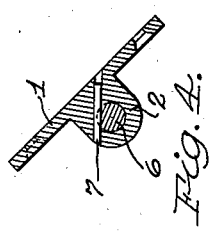
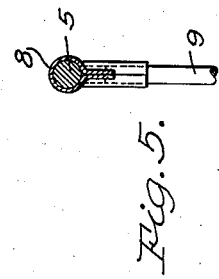
Inventor
Rex C. Jacobs,
By
Attorneys Patented June 20, 1939

2,163,340

UNITED STATES PATENT OFFICE 2,163,340

AUTOMOBILE GLARE SHIELD

Rex C. Jacobs, Detroit, Mich.

Application August 12, 1937, Serial No. 158,715

2 Claims. (Cl. 296—97)

The present invention relates to glare shields for automobiles and has for its primary object to provide a support adapted to be mounted within an automobile body above the windshield and having a pair of visors thereon which are swingable about substantially horizontal axes. By manually moving the visors or shield members about their horizontal axes they may be positioned to protect the eyes of the vehicle operator or passengers, or they may be positioned adjacent the roof where they leave the entire windshield unobstructed.

An important object of the invention is to provide means for supporting the horizontal pivot members, comprising a bracket supporting an elongate rod at a point intermediate its ends, the rod being bent in the nature of a comparatively flat V, and means being provided in the bracket for preventing rotation of the rod whereby the angularly disposed ends thereof remain in substantially the same horizontal plane. The visors or shield members have means engaging the ends of the rods, said means cooperating with the rods in providing a hinge.

With the above and other ends in view the invention is more fully disclosed with reference to the accompanying drawing, in which Figure 1 is a front elevation;

Fig. 2 is a plan view;

Fig. 3 is a vertical section of an automobile, illustrating the present device assembled therein, and Figs. 4 and 5 are sections taken respectively on the lines 4—4 and 5—5 of Fig. 1.

Like characters of reference are employed throughout to designate corresponding parts.

The numeral 1 designates the base portion of a bracket having a bearing portion 2. The bracket is adapted to be secured to the body structure of an automobile, preferably at a point above the windshield 3, as illustrated in Fig. 3. The bracket is secured to the automobile body structure, as mentioned above by fastening elements 4, and is positioned with the axis of the bearing portion 2 extending horizontally.

A bent rod, composed of two integrally united, angularly bent arms 5, has its central portion 6 mounted in the bearing portion 2. A pin 7 extends through the bearing portion, tangentially with respect to the rod, and engages the rod portion 6 as shown in Fig. 4 to prevent rotation thereof in the bearing portion 2. The pin 7 engages the rod portion 6 and holds it in a position where the two angular arm portions 5 reside in substantially the same horizontal plane, when the bracket is mounted as above described. When so mounted, the two arms 6, extend rearwardly of the automobile, as may be seen in Fig. 3.

Mounted upon the arms 5 are the visors or shield members. The shield members comprise tubular portions 8 and frame members 9 secured thereto which are adapted to support an opaque covering, a portion of which is illustrated at 10. The tubular portions 8 are sleeved upon respective arms 5 whereby the latter support the frames for swinging movement about horizontal axes.

Semi-transparent glare shields are already known to the art and it will be apparent to those skilled in the art that shields of this type may be substituted for the opaque type which are here shown by way of example.

Although a specific embodiment of the invention has been illustrated and described it will be understood that various changes may be made within the scope of the appended claims without departing from the spirit of the invention, and such changes are contemplated.

What I claim is:

1. In a glare shield structure, a supporting bracket having an aperture, a rod received and supported intermediate its ends in said aperture, a pin extending into said aperture and engaging said rod to lock said rod against movement relative to said bracket, and a pair of spaced shield members mounted for individual movement on the end portion of said rod.

2. In a glare shield structure, a supporting bracket having an open ended bearing, a rod received and supported intermediate its ends in said bearing, means extending into said bearing and engaging said rod to hold said rod against movement relative to said bracket, and a pair of spaced shield members mounted for individual movement on said rod on opposite sides of said bracket.

REX C. JACOBS.